United States Patent [19]

Venthem et al.

[11] Patent Number: 4,888,710

[45] Date of Patent: Dec. 19, 1989

[54] PEN TIP POSITION DETECTOR

[75] Inventors: John C. Venthem, Georgetown; James A. Parnell, Austin; Mark Hill; Dan R. Poole, both of Austin, all of Tex.

[73] Assignee: Ametek, Inc., Austin, Tex.

[21] Appl. No.: 131,984

[22] Filed: Dec. 11, 1987

[51] Int. Cl.⁴ ............... G06K 5/00; G01D 18/00
[52] U.S. Cl. .................... 364/520; 346/49; 346/139 R
[58] Field of Search ............. 346/139 R, 139 C, 49; 361/173; 364/520

[56] References Cited

U.S. PATENT DOCUMENTS

| | | | |
|---|---|---|---|
| 3,555,254 | 1/1971 | Gerber | 364/520 |
| 3,686,681 | 8/1972 | Stegenga | 346/139 C |
| 4,328,507 | 5/1982 | Kyogoku | 346/139 R |
| 4,503,441 | 3/1985 | Tamukai | 346/139 R |
| 4,567,565 | 1/1986 | Haselby et al. | 364/520 |
| 4,573,129 | 2/1986 | Tribolet et al. | 346/139 R |
| 4,630,483 | 12/1986 | Engdahl | 73/652 |
| 4,660,055 | 4/1987 | Enda | 346/139 R |
| 4,677,572 | 6/1987 | Gunderson et al. | 364/520 |

Primary Examiner—Gary V. Harkcom
Assistant Examiner—Raymond J. Bayerl
Attorney, Agent, or Firm—Amster, Rothstein & Ebenstein

[57] ABSTRACT

Apparatus, for use in conjunction with a digital plotter incorporating controlled multiple markers to create displays, for determining the position of the markers along axes of movement, comprises a detector assembly disposed at a fixed axial position relative to the plotter, and a driver for moving a marker relative to the detector assembly. The detector assembly includes means for detecting movement of the marker relative thereto and producing signals indicative of the movement. A processor interprets the signals for determining an axial position of the marker and optionally detects and compensates for a variation in the axial position of a current marker relative to the axial position of a prior marker.

30 Claims, 5 Drawing Sheets

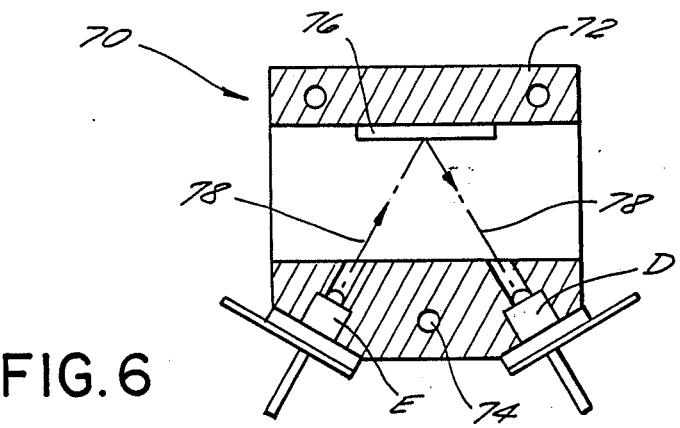
FIG. 6
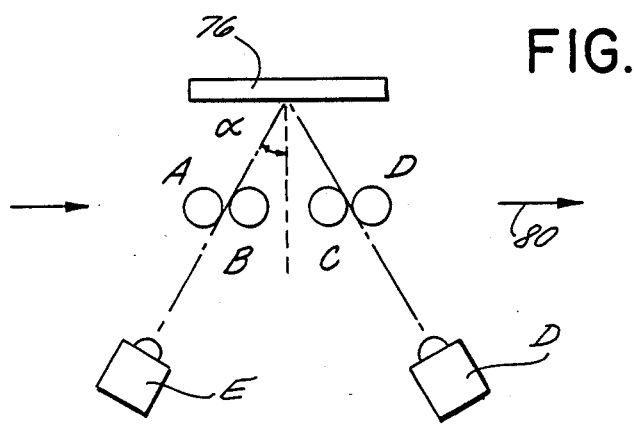
FIG. 7
FIG. 8
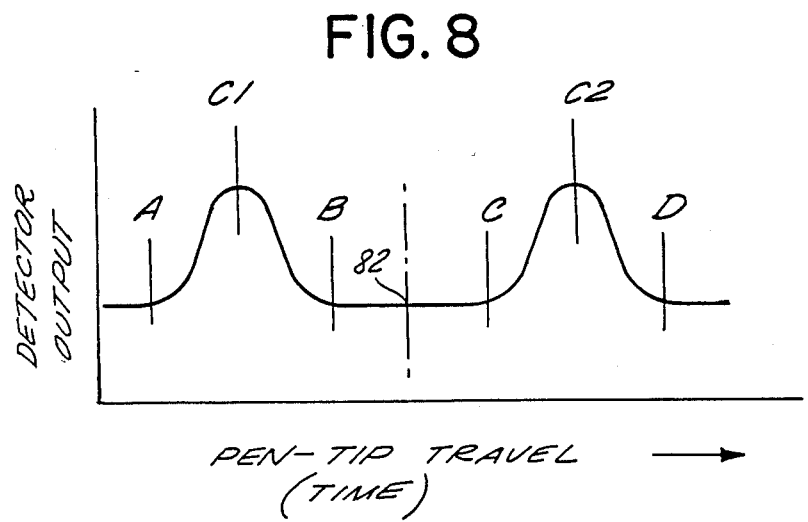

PEN TIP POSITION DETECTOR

BACKGROUND OF THE INVENTION

The present invention relates to an apparatus and method for use in conjunction with graphics equipment incorporating controlled multiple marking devices to create displays, and more particularly, such apparatus and method for use in determining the position of the marking devices along axes of movement.

Digital plotters and similar graphics equipment frequently utilize pencils, pens or other marking devices to develop a plot, graph, or similar graphics. Typically, in an XY plotter, the paper, chart or other medium to be marked is moved through the plotter, along the X axis, and a carriage is moved perpendicular to the feed of the medium, along the Y axis. The carriage typically is adapted to receive a pen or similar marking device from a carousel or other magazine containing a plurality of pens, then to move the pen back and forth along the Y axis in order to develop the graphics (in conjunction with the movement of the paper along the X axis), and finally to return the pen to the carousel, either in the initial location or in a new location if the carousel has subsequently rotated. In order to facilitate retention of the pen by the carousel and by the carriage, the pen is typically disposed in a special adaptor or casing. It will be appreciated that other XY digital plotters utilize a stationary paper or chart and the pen carriage is capable of movement along both the X and Y axes.

The accuracy of the graphics produced by a digital plotter is limited by any inaccuracy of the pen tip itself—that is, the extent to which the position of the pen tip contacting the paper varies from the corresponding XY position of the carriage. Such inaccuracies may be caused by gross manufacturing defects or by misalignments resulting from trauma to the pen, the adaptor or the carriage. However, they may also be a result of even normal manufacturing tolerances of the pen (for example, such that the tip is not in perfect alignment with the central axis of the barrel), its adaptor or the carriage. Even the slightest positional errors in the position of the pen tip may become quite evident when a continuous line is formed using two or more pens. This may be required where the continuous plot is to consist of segments of different colors or simply where, in the midst of a plot, the current pen runs out of ink or otherwise becomes defective and requires replacement. Many other instances arise in which even a slight inexactitude in the disposition of the pen tip is unacceptable—for example, where different pens are to draw closely-spaced parallel lines.

Accordingly, it is an object of the present invention to provide an apparatus and method, for use in conjunction with a digital plotter incorporating controlled multiple marking devices to create displays on a medium, for determining the position of the marking devices along axes of movement.

Another object is to provide such apparatus and method for detecting and compensating for variation in the axial position of a current marking device along an axis relative to the axial position of a prior marking device.

A further object is to provide such apparatus and method which is functionally related to the position of the marking device by electrical signals from either electro/mechanical sensors or with one or more beams of radiation.

It is another object of the present invention to provide such apparatus and method which identifies the pen tip position detected by the sensors or beams and positions a successive pen tip to the position of a prior pen tip by first determining the location of the successive pen tip with the sensors or beams and correcting its position by moving the pen carriage, the medium, or both.

SUMMARY OF THE INVENTION

It has been found that the above and related objects of the present invention are obtained in apparatus, for use in conjunction with a digital plotter incorporating controlled multiple marking devices to create displays on a medium, for determining the position of the marking devices along axes of movement. The apparatus generally comprises a detector assembly, disposed at a fixed axial position relative to the plotter, and means for moving a marking device relative to the detector assembly. The detector assembly includes means for detecting movement of the marking device relative to the detector assembly and producing signals indicative of the movement. The apparatus also includes means for interpreting the signals for determining an axial position of the marking device.

In a preferred construction, the apparatus further comprises means for detecting and compensating for a variation in the axial position of a current marking device along an axis relative to the axial position of a prior marking device. Such detecting and compensating means more particularly comprise means for determining the axial position of the current marking device along an axis relative to the axial position of the prior marking device, and means for adjusting subsequent movement of the current marking device or the medium or both to compensate for any positional difference between the prior and current marking devices.

Preferably the interpreting means interprets the signals as functionally related to an axial position of the marking device along mutually perpendicular first and second axes of movement. Where the apparatus is adapted for use in conjunction with an XY digital plotter, the axes of movement are the X, Y axes of the XY digital plotter.

In a first embodiment of the present invention, the detector assembly comprises a pair of beam emitters for producing two intersecting beams of radiation in the travel path of the marking device, and a pair of associated beam detectors to detect the beams and produce first and second signals indicative of the interruptions of the beams caused by a movement of the marking device through the beams. The order in which the first and second signals occur and the difference in the times of occurrence of the first and second signals is functionally related to the axial position of the marking device along a first axis, and the geometry of the detector assembly and the sum of the times of occurrence of the first and second signals is functionally related to the axial position of the marking device along a second axis.

In a preferred construction of the first embodiment, the apparatus additionally comprises means for determining the axial position of the marking device along the first axis by the order in which the first and second signals occur and the difference in the times of occurrence of the first and second signals, and for determining the axial position of the marking device along a second axis by the geometry of the detector assembly and the sum of the times of occurrence of the first and second signals. The means for determining the position of the marking device relative to the point of intersection of the two beams includes means for detecting which of the two beams is interrupted first as the marking device passes through the detector assembly to produce a third signal indicative of the position of the marking device relative to a given axis passing through the point of intersection of the two beams parallel to the second axis, means for determining the difference in the times of interruption of the beams to produce a fourth signal, and means for combining the third and fourth signals to provide a fifth signal indicative of the position of the marking device along the first axis. Preferably the beams cross the second axis at equal angles thereto.

In a second embodiment of the present invention, the detector assembly comprises a single beam emitter for producing a single beam of radiation, and a single beam detector for detecting the beam. The emitter and detector are both disposed to one side of the travel path of the marking device, and a reflector means is disposed on the other side of the travel path of the marking device for reflecting the beam from the emitter to the detector. The detector produces first and second signals indicative of the interruptions of the beam caused by a movement of the marking device through the beam. The difference in the times of occurrence of the first and second signals is functionally related to the axial position of the marking device along a first axis, and the sum of the times of occurrence of the first and second signals is functionally related to the axial position of the marking device along a second axis.

In a preferred construction of the second embodiment, the apparatus additionally comprises means for determining the axial position of the marking device along the first axis by the difference in the times of occurrence of the first and second signals, and for determining the axial position of the marking device along a second axis by the sum of the times of occurrence of the first and second signals.

In a preferred construction common to the first and second embodiments, the apparatus including means for determining the time of occurrence of each of the first and second signals, each such signal having a pack signal amplitude. Such means in turn comprise means for determining the times of occurrence of the signal with a preselected amplitude at times prior and subsequent to the occurrence of the peak signal amplitude, effectively determining the average time of occurrence for such preselected amplitude signals, and providing a third signal representative thereof. The process is repeated for at least one other preselected signal amplitude to develop at least one additional signal representative of the average time of occurrence for the signal with the other preselected signal amplitude. Then the third signal and the at least one additional signal are averaged to determine the time of occurrence of each of the first and second signals. The plurality of preselected amplitudes subsequent to the first preselected amplitude are preferably progressively increased by a fixed quantity.

In a third embodiment of the present invention, the detector assembly comprises a pair of sensors having contacts positioned in the travel path of the marking device and mounted with respect to an axis of travel of the marking device for deflection by the marking device, and displacement transducers operatively connected to the contacts to produce first and second signals indicative of the deflection of the contacts by a movement of the marking device relative to the contacts. The sum of the maxima of the first and second signals is functionally related to the axial position of the marking device along a first axis, and the times of occurrence of the beginning and ending of at least one of the first and second signals is functionally related to the axial position of the marking device along a second axis.

In a preferred construction of the third embodiment, the detector assembly comprises a pair of spring sensors having an opposed pair of semicircular contacts, each facing the second axis. The pair of sensors comprises a pair of spring lever arms, each lever arm having mounted thereon one of the contacts and one of the displacement transducers. Preferably the apparatus further comprises means for summing the maxima of the first and second signals to determine the axial position of the marking device along the first axis, and for averaging the times of occurrence of the beginning and ending times of at least one of the first and second signals to determine the axial position of the marking device along the second axis. Such means preferably is functionally related to the axial position of the marking device along the second axis by averaging the average of the times of occurrence of the beginning and ending of the first signal and the average of the times of occurrence of the beginning and ending of the second signal.

In a fourth embodiment of the present invention, the detector assembly comprises a single spring sensor positioned in the travel path of the marking device, including a single trapezoidal contact, and a single displacement transducer is operatively connected to the contact to produce a signal indicative of deflection of the contact by the marking device. The trapezoidal contact has first and second opposed sides of equal but oppositely directed slope and a third side between the first and second sides parallel to an axis of travel of the marking device for deflection by the marking device. The axial position of the marking device along a first axis is functionally related to the geometry of the contact and a signal indicative of the deflection of the contact caused by the engagement of the marking device with the first and second sides, and the axial position of the marking device along a second axis is functionally related to the geometry of the contact and a signal indicative of the deflection of the contact caused by the engagement of the marking device with the first, second and third sides.

The present invention further encompasses the methods performed by the foregoing apparatus in operation. A method for determining the position of multiple marking devices used with a digital plotter to create displays on a medium along axes of movement comprises the steps of providing a detector assembly disposed at a fixed axial position relative to the plotter, moving a marking device relative to the detector assembly, detecting the movement of the marking device and producing signals indicative of such movement, and interpreting the signals for determining an axial position of the marking device.

BRIEF DESCRIPTION OF THE DRAWING

FIG. 6 is a top plan view of a second embodiment of a detector assembly according to the present invention utilizing a single-beam emitter and a single-beam detector;

FIG. 7 is a schematic view of the detector assembly of FIG. 6 with a pen tip moving therethrough;

FIG. 8 is a graph of the detector output of the detector assembly of FIG. 6 as a function of pen-tip travel (time);

DETAILED DESCRIPTION OF THE PREFERRED EMBODIMENTS

Figure 1:
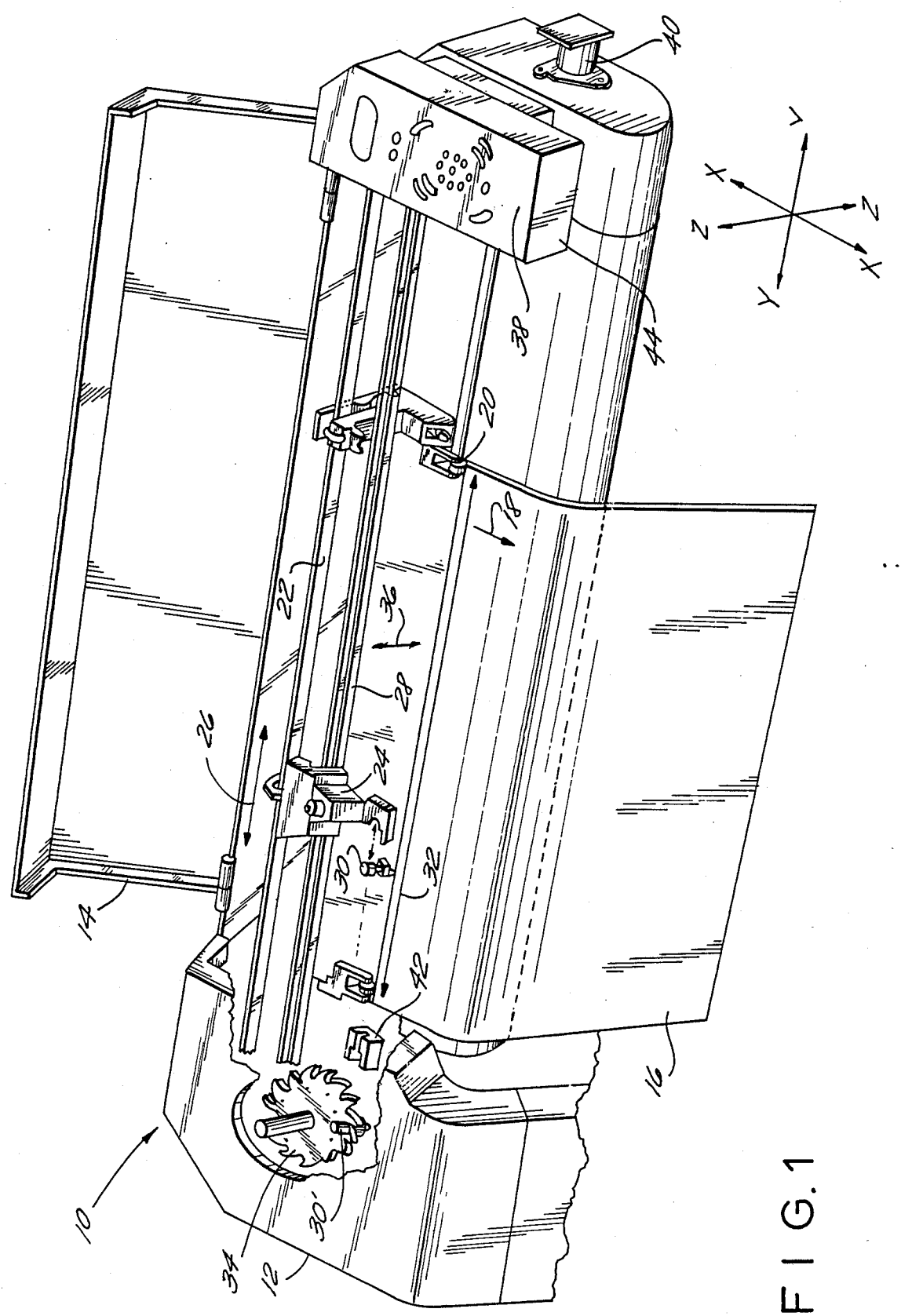
FIG. 1 is a fragmentary isometric view of a digital plotter incorporating the apparatus of the present invention.

Referring now to the drawings, and in particular to FIG. 1 thereof, therein illustrated is a representative XY plotter generally designated by the reference numeral 10. The plotter 10 includes a housing 12 having a pivotable top 14 shown in the open position. A medium 16, such as a chart or paper, is fed from a supply (not shown) forwardly in the direction of arrow 18 (or forwardly and backwardly) by adjustable pinch roll/drive drum assemblies 20, one on either edge of the paper 16. It will be appreciated that the movement of the paper 16 along the axis of arrow 18 is generally considered movement along the X axis.

A support bar 22 is positioned within the housing 12 and extends perpendicular to the axis of arrow 18. A pen carriage 24 is slidably secured to the support bar 22 and adapted to be moved back and forth in the direction of double-headed arrow 26 by a drive belt 28. The pen carriage 24 carries a pen 30 back and forth along what is generally considered to be the Y axis, as indicated by the double-headed arrow 32, perpendicular to the X axis.

In order to change pens, the pen carriage 24 is moved to the rotatably mounted pen carousel 34 at the left end of the plotter 10, where it deposits the present pen 30 and picks up the new pen 30'. The pen carriage 24 includes means (not shown) for raising and lowering the pen 30 down onto the surface of the paper 16 and up thereabove, as indicated by the double-headed arrow 36 in the Z axis, depending on whether or not the pen is to write. The same lowering and raising mechanism may be utilized to raise the pen over any obstruction (such as a pinch roll 20) the pen may encounter en route to or from the carousel 34. The plotter 10 further includes control means 38 for receiving electrical signals indicative of the display to be drawn on the paper 16 and for controlling the operation of drive means 40 in response thereto so as to direct movement of the pinch rolls 20 and the drive belt 28, and hence movement of the paper 16 along the X axis and movement of the pen 30 along the Y axis, respectively. The plotter 10 is a conventional piece of equipment, well known to those skilled in the graphic arts, and hence need no be described herein in further detail with respect to its conventional aspects.

According to the present invention, the plotter 10 additionally includes a detector assembly, illustrated in FIG. 1 as a "black box" 42, fixedly mounted in housing 12 but shown in greater detail in other figures and discussed in further detail in connection therewith. The detector assembly is disposed in a fixed position along the travel path of the pen 30 to one side or the other of the paper 18, beyond one edge or the other of the pathway for paper 16 so as not to interfere with the movement of the paper 16 through the plotter. It is preferably disposed, as shown, adjacent the edge of the pathway adjacent the pen carousel 34 since it is typically used immediately after a pen 30, 30' has been taken from the carousel 34. On the other hand, the detector assembly may be disposed on the edge of the pathway adjacent the other side of paper 16 for a number of reasons, including a lack of space adjacent the carousel side. In either case, the pen carriage 24 is able to overcome any obstacles encountered en route to and from the detector assembly, for example, by lifting the pen so as to clear pinch roll 20.

The detector assembly produces electrical signals and is operatively connected (for example, by electrical wires or by transmitted electrical signals) to memory and logic circuitry 44, such as a microprocessor, which may also conveniently be disposed in control means 38. As will be explained hereinbelow in greater detail, the detector assembly sends electrical signals to the logic and memory circuits 44, the latter including an appropriate analog-to-digital conversion mechanism so that data—for example, the strength of the signal emitted by the detector assembly as a function of time or pen travel—may be conveniently stored in the memory element. The logic and memory circuitry 44 operatively cooperates with the control means 38 to enable correction factors to be applied to the signals emanating from control means 38 for movement of the paper along the X axis and movement of the pen carriage along the Y axis. (It will be appreciated that in other types of products where the paper 16 is stationary and the pen carriage 24 is capable of movement in both the X and Y axes, the logic and memory circuitry 44 operatively cooperates with the control means 38 to enable correction factors to be applied to the movement of the pen carriage in both axes).

The present invention contemplates four preferred embodiments, each using a different detector assembly. Two of such detector assemblies utilize a photo emitter/photo detector assembly with beams of radiation (e.g., visible or infrared light) being interrupted by the motion of the pen tip therethrough and two of such detector assemblies utilize an electro/mechanical sensor with the contacts thereof being displaced by travel of the pen tip therepast. Each of the four detector assemblies will be shown and described separately below.

Figure 2:
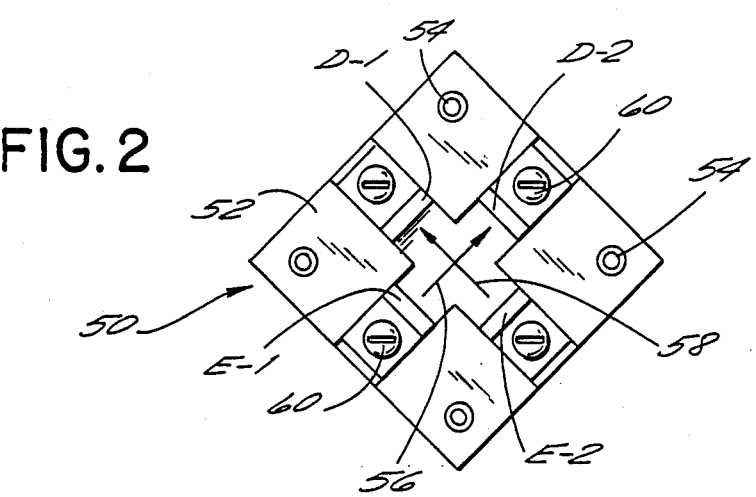
FIG. 2 is a top plan view of a first embodiment of a detector assembly according to the present invention utilizing a pair of beam emitters and a pair of beam detectors.
Figure 3:
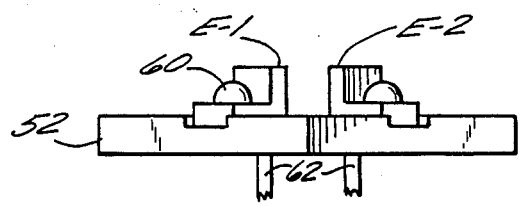
FIG. 3 is a side elevation view of the detector assembly of FIG. 2.

Referring now to FIGS. 2–5, a first embodiment of the present invention utilizes crossed beams of radiation with two photo detectors. Referring now to FIGS. 2 and 3 in particular, therein illustrated is a detector assembly, generally designated 50, suitable for use in the first embodiment. The detector assembly 50 comprises a planar square housing or frame 52 having mounting holes 54 in the corners for securing the detector assembly 50 in position on the plotter. A pair of photoemitters, identified as E-1 and E-2, and a pair of corresponding associated photo-detectors, identified as D-1 and D-2, are secured to the frame 52 by screws 60 so that the photo beams 56 and 58 passing from the emitters E-1 and E-2 to the detectors D-1 and D-2, respectively, intersect. Beam 56 forms the angle $\alpha$ with the axis, and the beam 58 forms the angle $\beta$ with the X axis, the angles being illustrated as 45°. The frame 52 has a clear area intermediate the associated emitters and detectors through which the pen tip can travel and intersect the beams 56, 58 of light. Each detector produces an electrical signal indicative of the interruption of its associated beam, caused by a movement of the pen tip through the beam, and is connected to external logic and memory circuitry through wires 62.

Figure 4:
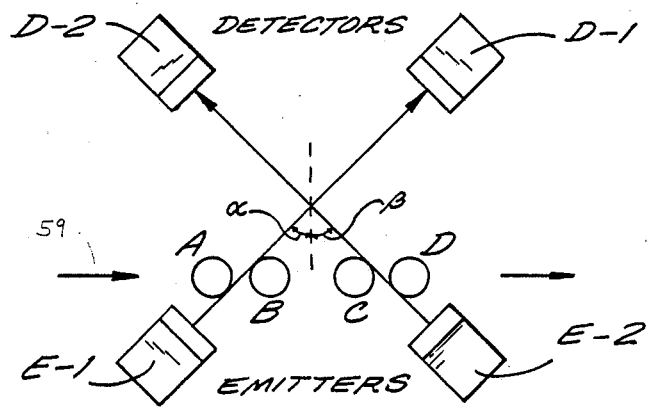
FIG. 4 is a schematic view of the detector assembly of FIG. 2 with a pen moving therethrough.

As schematically shown in FIG. 4, movement of the pen tip (indicated by circles) in the direction of the arrow 59 causes the pen tip to begin contact at point A with the beam 56 passing from emitter E-1 to detector D-1, eventually block off the beam 56, and finally terminate contact at point B with the beam 56, thereby to allow resumption of the beam passing to detector D-1. Similarly, further movement of the pen tip in the direction of the arrow 59 causes the pen tip to begin at point C to intercept the beam 58 passing from emitter E-2 to detector D-2, eventually to interrupt the beam 58 completely, and finally at point D to permit resumption of the beam 58 passing to detector D-2.

Figure 5:
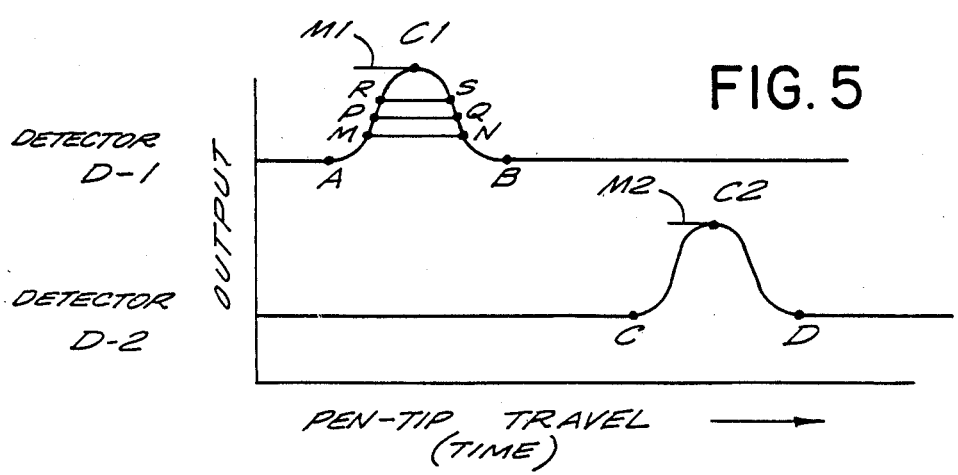
FIG. 5 is a graph of the detector output of the detector assembly of FIG. 2 as a function of pen-tip travel (time)

Referring now in particular to FIGS. 4 and 5, when a display is commenced with a new pen, the tip of the new pen is passed through the open area of the detector assembly 50. This causes the pen tip first to interrupt either beam 56 or beam 58. If the pen tip interrupts beam 56 first, the pen tip is below the center point (that is, the intersection point of the beams 56, 58); if the pen tip interrupts beam 58 first, the pen tip is above the center point. If the pen tip interrupts both beas 56, 58 simultaneously, the pen tip is directly at the center point. As illustrated in FIG. 4, the pen tip is below the center point and interrupts first beam 56 and then beam 58. As the pen tip interrupts the beam 56, the output of detector D-1 increases and decreases as shown in the top line of FIG. 5 to define a first signal. As the pen movement shown in FIG. 4 continues, the pen tip interrupts the beam 58 and the output of detector D-2 increases and decreases as shown in the bottom line of FIG. 5 to define a second signal.

For pedagogic purposes, it will be assumed that the pen tip moves through the detector assembly at a constant rate such that the detector output signal amplitude may be considered a function of either time or pen tip travel. In other words, the determination of the time of occurrence of a signal is also a determination of pen-tip travel along an axis. However, in point of fact, it is a functional equivalent to take data points at predetermined pen-tip travel points, with output signal amplitude being directly related to pen-tip travel distances, without regard to time.

For reasons which will become apparent hereinafter, it is important that the time of occurrence of each signal be precisely determined, both the first signal emitted by the detector D-1 when the beam 56 is interrupted, and the second signal emitted by the detector D-2 when the beam 58 is interrupted. These times can be determined in a number of different ways. Points A and B can be determined as a minimum or threshold deflection of the output of detector D-1 from its baseline or non-interrupted level (representing an interruption of beam 56), and points C and D can be determined as a minimum or threshold deviation of the output of detector D-2 from its baseline or non-interrupted level (representing an interruption of beam 58). The time of the signal from detector D-1 can then be interpreted as the average of the times for points A and B, while the time of the signal from detector D-2 can then be interpreted as the average of the time for points C and D. Alternatively, the maximum point M1 of the curve between points A and B can be taken as the time of the signal of detector D-1, while the maximum point M2 of the curve between points C and D can be taken as the time of the signal of detector D-2. While both of these techniques are theoretically workable, in practice they have not proven to be entirely reliable. As shown in the point M1 for the output of detector D-1 in FIG. 5, a single transient noise or glitch may so affect the one or two electrical signals being relied upon that greatly erroneous signal times are determined according to these techniques. Accordingly, it is preferred to utilize the averaging technique described below which relies on a number of different data points taken at different signal strengths so that an error in any small number of data points does not markedly affect the overall result.

Starting at an arbitrary time, as the pen tip travels toward, through, and optionally beyond the detector assembly 50, an array of data is compiled correlating the output amplitude of each detector against the time. Thus, if the pen tip travels at a constant rate through the detector assembly, this data array is also an array of detector signal output amplitude against pen-tip travel. The array is graphically illustrated in FIG. 5. The number of data points acquired for each array is functionally related to the accuracy of the curve and thus the accuracy of the correction which can be made. The pen tip need not actually stop for a reading.

Once the array of data points has been accumulated, a threshold increment is determined. The threshold increment It is determined according to the following formula:

$$I_t = (O_{max} - O_{min} - K)/L$$

where $O_{max}$ is the maximum value of output amplitude in the array;

$O_{min}$ is the minimum value of output amplitude in the array, generally the baseline value;

K is a constant, generally about half the value of $O_{min}$, selected so as to insure that the initial calculations are performed on the curve representing the signal and not on baseline data points; and L is the number of thresholds to be averaged, generally 16, with higher values providing more accurate corrections.

The threshold T is then initialized to $O_{min}$ plus K according to the formula:

$$T = O_{min} + K.$$

The array is then approached from both ends to locate the first datum from each end where the output is equal to or greater than the threshold. These two points are indicated in FIG. 5 as points M and N. Once located, the two times represented by these two data points are averaged to provide an average time $A_1$.

Next the threshold T is incremented by the threshold increment $I_t$ according to the formula $T = T + I_t$.

If the number of averagings is not yet equal to L, the search continues inwardly within the array from points M and N for the first data points where the output is at least equal to the incremented threshold. Once these points, indicated in FIG. 5 as P and Q, are determined, the two times thereof are averaged to provide a second averaged time $A_2$. The threshold is then incremented by the threshold increment $I_t$, and this procedure is repeated L times (for points R, S, etc.) to determine the averaged times $A_i$ for L different threshold values T. (Only three pairs of data points, rather than L pairs, are illustrated in FIG. 5 in order to preserve clarity of illustration). Next the centerline C1 for the first signal and the centerline C2 for the second signal, each equal to the average A of all of the averaged times of the signal, is determined by summing up all of the averaged times ($A_i$ through $A_L$) and dividing by L according to the formula:

$$A = \left( \sum_{i=1}^{i=L} A_i \right) / L$$

Assuming that the signal produced a perfect bell-shaped curve, with no noises or glitches being present, the centerline time obtained by this technique would be equal to that obtained by averaging data points A and B (or C and D) or determining a maximum point M1 or (M2). On the other hand, the centerline value obtained by this technique will remain relatively constant despite the presence of a few erroneous data points such as might result from noise or glitches.

If desired, even more sophisticated techniques may be utilized to enhance accuracy. For example, highest and lowest averaged times may be excluded before averaging the remaining averaged times. Alternatively, once the average of the averaged times has been calculated, any given averaged time which is not within a given percentage of the average averaged time may be excluded and the average averaged time redetermined based on the remaining averaged times.

As best seen in FIG. 4, the axial position of the pen tip along the X axis is functionally related to both the order in which the first and second signals occur (as this is functionally related to whether beam 56 or 58 is first interrupted and hence whether the pen tip is above or below the point of intersection of the beams 56, 58) and the difference in the times of occurrence of the first and second signals (as this is functionally related to how far above or below the oint of intersection the pen tip is disposed). The axial position of the pen tip along the Y axis is functionally related to both the geometry of the detector assembly and the sum (more particularly, the average) of the times of occurrence of the first and second signals.

The detector assembly 50 is shown as having the beams 56 and 58 form with the X axis angles $\alpha$ and $\beta$ respectively, with these respective angles each being equa and 45 degrees. The principles of the present invention are, however, equally applicable to variations of the first embodiment wherein the angles are not equal or are not 45 degrees. However in this instance more sophisticated calculations must be performed to compensate for the variance in angle.

In order to determine the correction factors to be applied to a current pen in order to bring its axial position into alignment with the axial position of a prior pen, the correction factors dx along the X axis and dy along the Y axis are computed as follows, where the prime values are those of the prior pen and the unprimed values are those of the current pen:

$$dx = [(C1' - C1) - (C2' - C2)]/(a + b)$$

$$dy = [b(C1' - C1) + a(C2' - C2)]/(a + b)$$

where $\alpha$ is the angle formed by the first beam with the X axis, and a is tan $\alpha$; and
$\beta$ is the angle formed by the first beam with the X axis and b is tan $\beta$.

Note that where both $\alpha$ and $\beta$ are 45°, tan $\alpha$ = tan $\beta$ = 1 and the formulae simplify as follows:

$$dx = [(C1' - C1) - (C2' - C2)]/2$$

$$dy = [(C1' - C1) + (C2' - C2)]/2$$

Thus when a current pen tip passes through the two beams and creates different signals than the prior pen, the position of the current pen can be corrected to the position of the prior pen by moving the pen carriage, the media or both by a total of dx along the X axis and a total of dy along the Y axis.

It will be appreciated that if the prime values representing the occurrence times of the prior pen are set to zero, the correction factors dx and dy may be determined as axial positions of the current pen relative to the detector assembly.

The axial position of the pen along the X axis is functionally related both to the order in which the first and second signals occur and the difference in the times of occurrence of the first and second signals. The axial position of the pen along the X axis is functionally related to the geometry of the detector assembly (that is, the angles $\alpha$ and $\beta$) and the average of the times of occurrence C1, C2 of the first and second signals.

Referring now to FIGS. 6–8, a second embodiment of the present invention utilizes a single beam of radiation with a single photo-detector. Referring now to FIGS. 6 and 7 in particular, therein illustrated is a detector assembly, generally designated 70, suitable for use in the second embodiment. The detector assembly 70 comprises a housing or frame 72 having mounting holes 74 for securing the detector assembly 70 in position on the plotter. A photo-emitter, identified as E, and associated photo-detector, identified as D, are secured to one side of the frame 72 with a reflecting mirror 76 being disposed on the other side of the frame so that a beam 78 emitted by the emitter E is reflected by the mirror 76 into the detector D. The frame 72 has an open area, intermediate the emitter E and detector D on one side and the mirror 76 on the other side, through which the pen tip can travel and intersect the beam 78 of light. The angle of the various components (emitter E, mirror 76 and detector D) in the housing 70 enables a beam 78 of light from the emitter E to cross the open area in the housing, reflect off the mirror 76, again cross the open area and be received by the detector D. Thus the open area in the housing 70 allows a moving pen tip to intersect the same beam of light twice The detector D is connected to external logic and memory circuitry through appropriate wiring (not shown) and produces a signal indicative of the interruption of the beam 78 caused by a movement of the pen tip through the beam. Interruption of the beam pre-reflection causes a first signal, and interruption of the beam post-reflection causes a second signal. The included angle between the pre-reflection and post-reflection beam is $2\alpha$, as shown in FIG. 7.

As schematically shown in FIG. 7, movement of the pen tip (indicated by circles) in the direction of the arrow 80 causes the pen tip to begin contact at point A with the beam 78 passing from the emitter E to the mirror 76, eventually block off the beam 78, and finally terminate contact at point B with the beam 78, to allow resumption of the beam passing to mirror 76. Similarly, further movement of the pen tip in the direction of the arrow 80 causes the pen tip to begin at point C to intercept the beam 78 passing from the mirror 76 to the detector D, eventually to interrupt the beam 78 completely a second time, and finally at point D to permit resumption of the beam 78 passing from the mirror 76 to the detector D.

Referring now in particular to FIGS. 7 and 8, when a display is commenced with a new pen, the tip of the pen is passed toward the open area of the detector assembly 70. This causes the pen tip first to interrupt the pre-reflection beam 78 passing from the emitter E to the mirror 76. As the pen tip interrupts the beam, the output of detector D increases and decreases as shown on the left hand side in the plot of FIG. 8 to define a first signal. As the pen movement shown in FIG. 7 continues, the pen tip interrupts the post-reflection beam 78 passing from the mirror 76 to the detector D and the output of the detector increases and decreases as shown in the right-hand side of FIG. 8 to define a second signal.

In order to determine the times of the first and second signals, a procedure similar to that utilized in the first embodiment is employed. Initially, however, some distinction must be made between the first signal represented roughly at its outer limits by points A and B and the second signal represented roughly at its outer limits by the points C and D. While this could be performed with mathematical rigor, it suffices for the purposes of the present invention to determine point A representing the beginning of the first signal (the leftmost part thereof as shown in FIG. 8) and to determine the point D representing the end of the second signal (the rightmost portion thereof as shown in FIG. 8), and then to consider as the dividing line or split 82 between the first and second signals the average of the times of points A and D. Thereafter in calculating the time of the first signal only the data points in the array prior to the time of the split 82 are considered, and in calculating the time of the second signal only the data points in the array subsequent to the time of the split 82 are considered.

The axial position of the pen tip along the X axis is functionally related both to the geometry of the detector assembly 50 and the difference in the times of occurrence of the first and second signals—that is, the differences between C1 and C2 in FIG. 8. The closer these times are together, the closer the pen tip is to the side of the frame 72 containing the mirror 76; and the farther these times are apart, the closer the pen tip is to the side of the frame 72 containing the emitter E and detector D. The axial position of the pen along the Y axis is functionally related to the sum of the times of the first and second signals—that is, the sum (more particularly the average) of C1 and C2 in FIG. 8.

For the second embodiment, calculation of the correction factors dx, dy for a current pen relative to a prior pen is essentially the same as indicated in the first embodiment, except for variations arising out of the geometry of the detector assemblies, as shown in the following formula:

$$dx = [(C1' - C1) - (C2' - C2)]/2a$$

$$dx = [(C1' - C1) + (C2' - C2)]/2$$

where $a = \tan \alpha$ and
$\alpha$ = half the included angle between the pre-reflection and post-reflection beam portions.

Of course, where $\alpha$ is 45°, $\tan \alpha$ is 1. Where the angles $\alpha$ and $\beta$ of the first embodiment and angle $\alpha$ of the second embodiment are all 45°, the dx and dy equations of both embodiments are identical.

Figure 9:
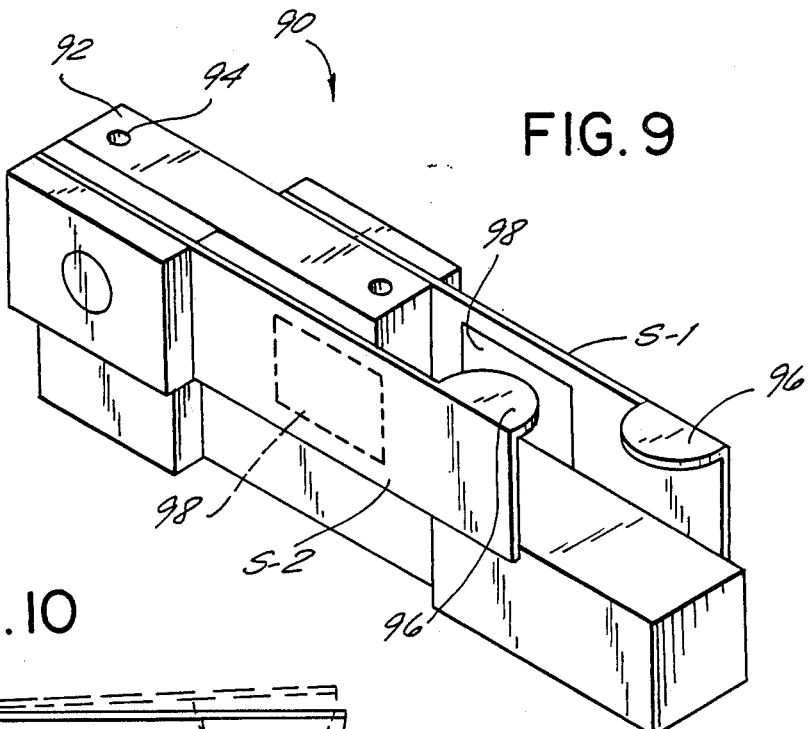
FIG. 9 is an isometric view of a third embodiment of a detector assembly according to the present invention utilizing a pair of electro/mechanical sensors having semicircular contacts.

Referring now to FIGS. 9–12, a third embodiment of the present invention utilizes a pair of electromechanical sensors with strain gauges. Referring now to FIG. 9 in particular, therein illustrated is a detector assembly, generally designated 90, suitable for use in the third embodiment. The detector assembly 90 comprises a base block 92 having mounting holes 94 for securing the detector assembly 90 in position on the plotter. A pair of spring sensors S-1 and S-2 are attached at one end to opposite sides of the base block 92 at offset positions, the base block 92 itself serving as a spacer between the two sensor springs S-1, S-2. Each sensor spring includes a semicircular contact 96 at the free end thereof and an associated resistive strain gauge 98 near its center. The strain gauge 98 of each sensor spring produces an electrical signal indicative of deflection of the associated spring sensor contact 96, caused by a movement of the pen tip through the volume initially occupied by the associated contact 96, and is functionally connected to external logic and memory circuitry through wires (not shown). The spring sensors S1, S2 are disposed on the block 92 in such close juxtaposition that movement of the pen tip along the Y axis will, in all reasonably anticipatable instances, cause some deflection of both contacts 96. While there are obviously clear advantages to the use of semicircular contacts 96, contacts of other design and shape may be utilized instead.

Figure 10:
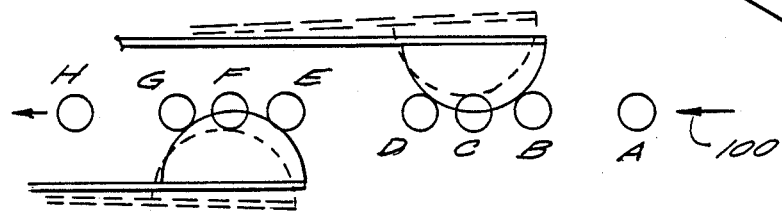
FIG. 10 is a schematic view of the detector assembly of FIG. 9 as with a pen tip moving therethrough.

As schematically shown in FIG. 10, movement of the pen tip (indicated by circles) in the direction of the arrow 100 (passing from point A to point H) causes the pen tip at point B to begin physical engagement with the contact 96 of sensor S-1 and thus its rearward deflection. Further pen tip travel eventually causes at point C a maximum deflection of the sensor S-1 (see phantom line position of sensor S-1), and finally at point D allows return of the sensor S-1 to its normal position once engagement is terminated. Similarly, further movement of the pen tip in the direction of the arrow 100 causes the pen tip to begin at point E the forward deflection of the sensor S-2, to provide at point F the maximum deflection (shown in phantom line for sensor S-2), and to permit at point G return of the sensor S-2 to its original position after engagement is broken.

Figure 11:
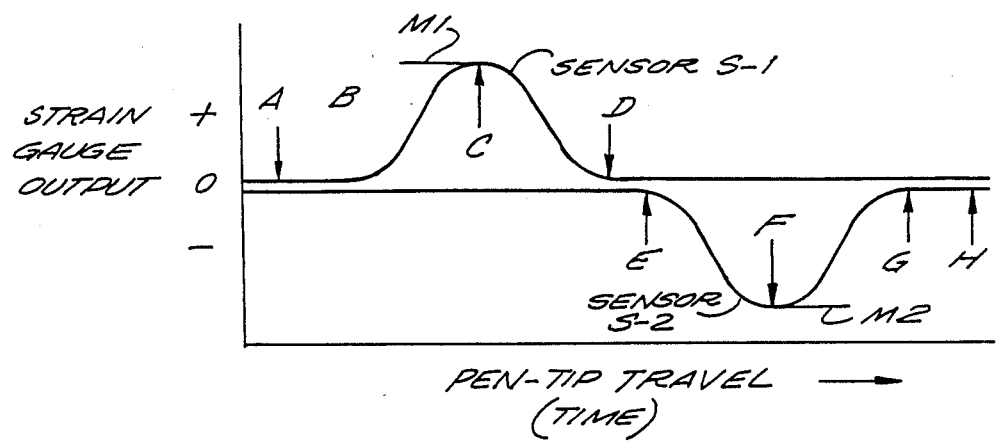
FIG. 11 is a graph of the strain gauge output of the detector assembly of FIG. 9 as a function of pen-tip travel (time)

Referring now in particular to FIGS. 10 and 11, when a display is commenced with a new pen, the tip of the new pen is moved along the Y axis so as to deflect both contacts 96 in turn. After both contacts have returned to their original position, the pen tip is lifted and withdrawn from the detector assembly 90 by movement in the opposite direction, no readings being taken on the return trip. The output of the individual strain gauges is illustrated in FIG. 11 with movement to the rear of the detector assembly 90 being deemed positive movement and movement to the front thereof being deemed negative movement. Thus the signal produced by the rear sensor S-1 is shown as positive and the signal produced by the front sensor S-2 is shown as negative. For clarity of illustration, the baseline of the strain gauge output, as evidenced by points A, B and D of sensor S-1 and E, G and H of sensor S-2 have been separated slightly relative to the zero axis of the graph. For the purposes of the present embodiment, the only data points which are utilized are points B through G.

The elaborate averaging procedure preferably utilized to determine signal occurrence times or centerlines in connection with the first and second embodiments using light beams is not as important in connection with the third embodiment, although it is still preferred. For expository purposes the third embodiment will be described in connection with a simpler procedure. However it will be appreciated that for enhanced accuracy the centerlines and maximum strain gauge output amplitudes may be determined by the same and analogous averaging procedures, respectively.

The axial position of the pen tip along the Y axis is functionally related to the sum (or more particularly, the average) of the positions represented by the points B and D, the points E and G, or, for greater accuracy, the points B, D, E, and G—that is, the centerlines C1, C2 or C1 and C2 of the deflection(s). The axial position of the pen tip along the X axis is functionally related to the sum (or more particularly the average) of the strain gauge output amplitudes, M1 for the maximum amplitude of rear sensor S-1 and M2 for the maximum amplitude of the front sensor S-2. As it is only a reference position which is being determined, the value M2 may be either signed or absolute. (Where the signed values of the strain gauge outputs M1 and M2 are added together, the sum is functionally related to the width of the pen tip in the X axis.)

In order to determine the correction factors dx, dy to be applied to a current pen in order to bring its axial position into alignment with the axial position of the prior pen, the correction factors dx and dy are computed as follows:

$$dx = [(M1' - M1) - (M2' - M2)]/2$$

$$dy = [(C1' - C1) + (C2' - C2)]/2$$

It will be appreciated that the formula for dy is identical to the formula for the second embodiment and identical to the simplified version of the formula for the first embodiment (where the angles $\alpha$ and $\beta$ equal 45°). Certain like similarities may also be noted among the various formulae for dx with the signal amplitude maxima M1, M2 replacing the signal centerline times C1, C2.

Figure 12:
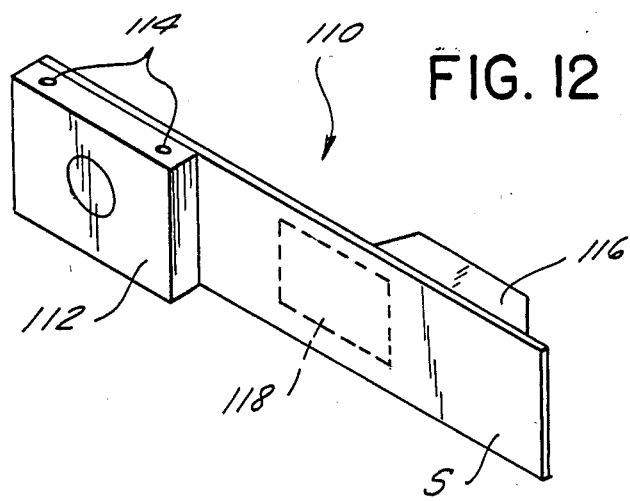
FIG. 12 is an isometric view of a fourth embodiment o a detector assembly according to the present invention utilizing a single electro/mechanical sensor having a trapezoidal contact.

Referring now to FIGS. 12–15, a fourth embodiment of the present invention utilizes a single electromechanical spring sensor with a strain gauge. Referring now to FIG. 12 in particular, therein illustrated is a detector assembly generally designated 110, suitable for use in the fourth embodiment. The detector assembly 110 comprises a mounting block 112 having mounting holes 114 for securing the detector assembly 110 in position on the plotter. A single spring sensor, identified as S, is secured to the holder 112. The sensor S has a trapezoidal contact 116 at the free end thereof and an associated strain gauge 118 near its center. The strain gauge 118 produces an electrical signal indicative of deflection of the sensor contact 116, caused by a movement of the pen tip through the space normally occupied by the trapezoidal contact 116, and is functionally connected to external logic and memory circuitry through wires (not shown). As more clearly shown in FIG. 15, the trapezoidal contact 116 has its long side flush mounted on the arm of sensor S, with its non-parallel sides sloping inwardly at an angle. Its long side has a length 2 d, and its height (between parallel sides) is h.

Figure 13:
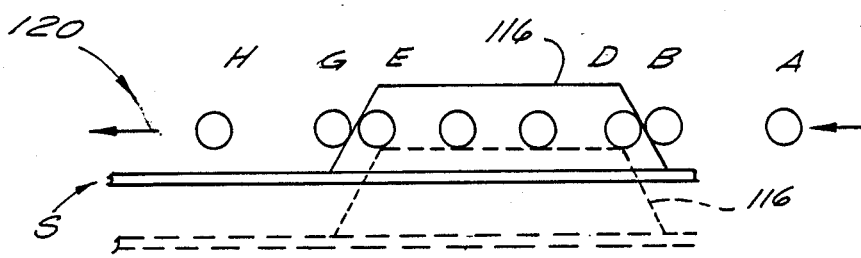
FIG. 13 is a schematic view of the detector assembly of FIG. 12 as a pen moves therethrough.

As schematically shown in FIG. 13, movement of the pen tip (indicated by circles) in the direction of the arrow 120 (from baseline point A to baseline point H) causes the pen tip to begin engagement at point B with an inclined side of the trapezoidal contact 116, thereby to commence deflection of the sensor S. As the pen tip travels further in the direction of arrow 120, at point D the sensors reaches a point of maximum deflection and remains there through point E, after which the sensor S resumes its normal orientation as the pen tip reaches point G and terminates engagement with contact 116.

Figure 14:
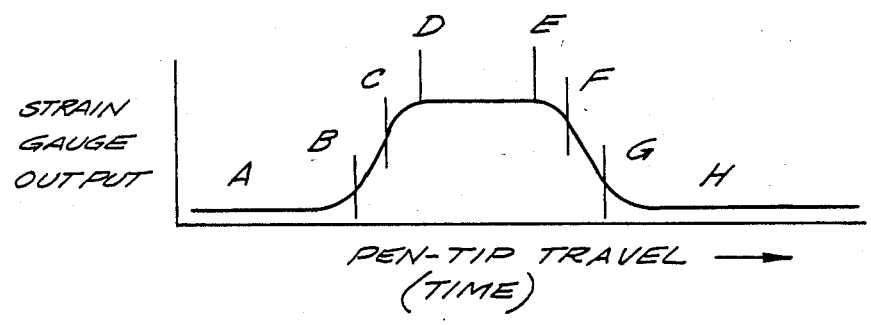
FIG. 14 is a graph of strain gauge output of the detector assembly of FIG. 12 as a function of pen-tip travel (time)
Figure 15:
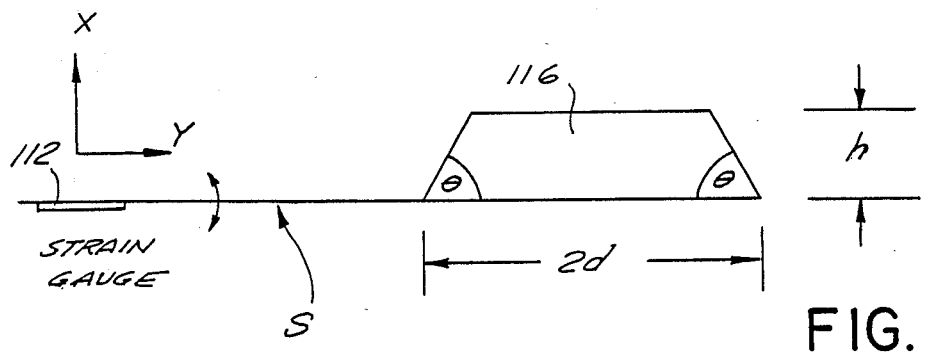
FIG. 15 is a schematic top plan view of the detector assembly of FIG. 12.

As seen in FIG. 14, as the pen tip contacts the contact 116 at point B, it begins to deflect the strain gauge and the output signal is initiated. The output of the strain gauge increases as the pen tip moves from point B through point C and on to point D. As the pen tip progresses from point D to point E, the strain gauge output remains constant. As the pen tip moves from point E through point F to point G, the strain gauge output decreases. Thus, as the pen tip travels toward, through and beyond the contact, an array of data is compiled correlating the output amplitude of the strain gauge against the time or pen-tip position along the Y axis. The position $X_o$ of the current pen tip relative to the sensor along the X axis is functionally related to the signals produced by deflections arising out of engagement between the pen tip and the non-parallel sides of the contact 116, and the position $Y_o$ of the current pen tip relative to the sensor along the Y axis is functionally related to the signals produced by deflections arising out of engagement between the pen tip and the short side and non-parallel sides of the contact 116. $X_o$ and $Y_o$ are determined more particularly according to the following formulae:

$$Y_o = [\Sigma (o_i' - o_i)/2n \sin \theta] + [\Sigma (y_i' + y_i)/2n]$$

$$X_o = \left[\left[\frac{\Sigma (o_i' + o_i)}{2n}\right] + \left[\frac{\Sigma (y_i - y_i')}{2n}\right] + d \sin \theta + \left[\left(h + \Sigma \frac{y_i''}{n}\right)(\sin^2 \theta + \cos \theta)\right]\right]/(1 + \sin^2 \theta + \cos \theta)$$

where $y_i$ are positions along the Y axis between points B and C;

$o_i$ are strain gauge outputs between points B and C;

$y_i'$ are positions along the Y axis between points F and G; and $o_i'$ are corresponding outputs between point F and G;

$y''_i$ are positions along the Y axis between points D and E;

n is the number of readings taken between points B and C, D and E, and F and G, the same number having been taken for all three surfaces;

h is the height of the contact between parallel sides thereof; and $\theta$ is the angle between the long side and the non-parallel sides of the contact.

The correction factors dx along the X axis and dy along the Y axis may then be calculated as follows:

$$dx = X_o' - X_o$$

$$dy = Y_o' - Y_o$$

where $X'_o$ and $Y'_o$ are the $X_o$ and $Y_o$ values for the prior pen.

It will be appreciated that in the third and fourth embodiments where a contact or stylus is physically deflected by the pen tip, the deflection may be measured by any conventional displacement transducer including the strain gauges illustrated and described, force transducers and the like.

In operation, an initial pen is obtained by the pen carriage from the pen carousel. The pen carriage is then moved along a predetermined path calculated to cause the pen tip to pass through the operative part of the detector assembly 50, 70, 90, 110 (i.e., the light beams or contacts). Depending upon the embodiment being utilized, the appropriate times, signal amplitudes and the like are then determined in order to characterize the initial pen. The first pen is then used, as intended, to create a plot. When the first pen is returned to the carousel and a new pen is obtained therefrom by the pen carriage, any previously applied corrections for the pen tip position are cancelled. The new pen is then moved through the operative part of the detector assembly, and, from the data thus collected, new values are obtained for the appropriate times, signal amplitudes and the like. The appropriate correction factors dx and dy are then calculated using the above-identified characteristics of the initial pen and the new pen, the appropriate equations and any required geometric constants for the detector assembly having previously been stored in memory. The correction factors dx and dy are then applied to the new pen and medium movements as the new pen is used to plot. Eventually the new pen is returned to the carousel, and the next pen is obtained and moved through the detector assembly, repeating the cycle. It will be appreciated that preferably the correction factor to be applied to the current pen is, at all times, relative to the initial pen rather than the immediate prior pen (except where the immediately prior pen happens to be the initial pen). As desired, however, the immediately prior pen rather than the initial pen may be used as the prior pen for calculating the correction factors dx and dy, although in this instance the errors and inexactitudes of each calculation of dx and dy accumulate. Thus the prior pen may be either the initial pen or the immediately prior pen. (In any case the current and initial pens may be the same physical entity as error can arise even when the same pen is picked up a second time.)

As it can be assumed that the same detector assembly will be used for characterizing the positions of both the current pen and the prior pen, in most instances the factors within the various equations for dx and dy relating to the geometry of the detector assembly are constant.

Conceptually, the present invention is most easily considered as a method of determining the axial positions of the current pen and the prior pen and then providing compensation to bring the axial position of the current pen into alignment with the axial position of the prior pen. It will be appreciated, however, that once the characteristics determining position (such as centerlines, signal amplitude maxima, and the like) have been determined for both the current pen and the prior pen, the correction factors dx and dy may be calculated directly from these characteristics without ever actually calculating the axial positions themselves for either pen. Indeed, as the axial positions themselves are relative to the detector assembly and the location of the detector assembly is not precisely known, the "axial position" itself is of little significance. Accordingly, throughout the present specification and the appended claims, the determination of an "axial position" is functionally equivalent to, encompasses, and is satisfied by a determination of the "characteristics of the axial position"—in other words, a determination of the centerlines for the first and second embodiments and the centerlines and signal amplitude maxima for the third embodiment. Indeed, the formulas for determining dx and dy for the first, second and third embodiments may be rearranged into $X_o$ and $Y_o$ axial positions for the current pen and an $X_o'$ and $Y_o'$ position for the prior pen, much as in the manner of the equations dx and dy for the fourth embodiment. For example, the equation dx for the first embodiment may be rearranged as follows:

$$\begin{aligned} dx &= [(C1' - C1) - (C2' - C2)]/(a+b) \\ &= [(C2 - C1) - (C2' - C1')]/(a+b) \\ &= \frac{(C2 - C1)}{(a+b)} - \frac{(C2' - C1')}{(a+b)} \\ &= X_o - X_o' \end{aligned}$$

Thus in every calculation of dx or dy, there is an implicit calculation of the axial positions $X_o$ or $Y_o$.

It will be appreciated that, while in the first and second embodiments a system is shown wherein normally there is no signal and a positive signal results from an interruption of the light beam by the pen tip, this is functionally equivalent to, encompasses and is satisfied by a system wherein normally there is a positive signal and an interruption of that positive signal (that is, the creation of a negative signal) results from an interruption of the light beam by the pen tip.

As used in the specification and claims hereof, the determination of the position of the marking device refers to a determination of the position of the portion of the marking device contacting the paper, chart or other medium being marked—e.g., the pen tip, pencil point, etc. While the present invention is described with respect to a pen, clearly the principles of the present invention are equally applicable to other marking devices such as pencils or lasers which might be used to create a display on a medium, including a heating element intended to mark a heat-sensitive medium.

To summarize, the present invention provides an apparatus and method, for use in conjunction with a digital plotter incorporating controlled multiple marking devices to create displays on a medium, for determining the axial position of the marking devices along axes of movement and for detecting and compensating for variations in the axial position of a current marking device along one axis relative to the axial position of a prior marking device along the same axis. The present invention accomplishes the same using apparatus and method which functionally relate the position of the marking device to electrical signals from either electro/mechanical or photoelectric sensors. The pen tip position is detected by the sensors and a current pen tip is positioned relative to a prior pen tip by first determining the position of successive pen tips with the sensors and then correcting the position of the current pen tip by moving the carriage, the medium, or both.

Now that the preferred embodiments of the present invention have been shown and described in detail, various modifications and improvements thereon will become readily apparent to those skilled in the art. Accordingly, the appended claims should be construed broadly and in a manner consistent with the spirit and scope of the invention herein.

What is claimed is:

1. Apparatus, for use in conjunction with a digital plotter incorporating controlled multiple marking devices and means for moving the same along a travel path to create displays on a medium, for determining the position of the marking devices along axes of movement, comprising:
   (A) a detector assembly, disposed at a fixed axial position relative to the plotter and proximate the travel path of the marking devices, for detecting movement of a marking device relative to said detector assembly and producing signals indicative of the movement, including a pair of beam emitters for producing two intersecting beams of radiation in the travel path of the marking device, and a pair of associated beam detectors to detect the beams and produce first and second signals indicative of the interruptions of the beams caused by a movement of the marking device through the beams, whereby the order in which the first and second signals occur and the difference in the times of occurrence of the first and second signals is functionally related to the axial position of the marking device along a first axis, and the geometry of said detector assembly and the sum of the times of occurrence of the first and second signals is functionally related to the axial position of the marking device along a second axis; and
   (B) means for interpreting the signals for determining an axial position of the marking device.

2. The apparatus of claim 1 including means for determining the time of occurrence of each of the first and second signals, each such signal having a peak signal amplitude, comprising means for determining the times of occurrence of the signal with a preselected amplitude at times prior and subsequent to the occurrence of the peak signal amplitude and effectively determining the average time of occurrence for such preselected amplitude signals and providing a third signal representative thereof, repeating the process for at least one other preselected signal amplitude to develop at least one additional signal representative of the average time of occurrence for the signal with the other preselected signal amplitude and averaging the third signal and the at least one additional signal to determine the time of occurrence of each of the first and second signals.

3. The apparatus of claim 1 wherein the plurality of preselected amplitudes subsequent to the first preselected amplitude are progressively increased by a fixed quantity.

4. The apparatus of claim 1 additionally comprising means for determining the axial position of the marking device along the first axis by the order in which the first and second signals occur and the difference in the times of occurrence of the first and second signals, and for determining the axial position of the marking device along a second axis by the geometry of said detector assembly and the sum of the times of occurrence of the first and second signals.

5. The apparatus of claim 1 further comprising means for determining the position of the marking device relative to the point of intersection of the two beams, including means for detecting which of the two beams is interrupted first as the marking device passes through said detector assembly to produce a third signal indicative of the position of the marking device relative to a given axis passing through the point of intersection of the two beams parallel to the second axis, means for determining the difference in the times of interruption of the beams to produce a fourth signal, and means for combining the third and fourth signals to provide a fifth signal indicative of the position of the marking device along the first axis.

6. The apparatus of claim 1 wherein the beams cross the second axis at equal angles thereto.

7. Apparatus, for use in conjunction with a digital plotter incorporating controlled multiple marking devices and means for moving the same along a travel path to create displays on a medium, for determining the position of the marking devices along axes of movement, comprising:
   (A) a detector assembly, disposed at a fixed axial position relative to the plotter and proximate the travel path of the marking devices, for detecting movement of a marking device relative to said detector assembly and producing signals indicative of the movement, including a single beam emitter for producing a single beam of radiation, a single beam detector for detecting the beam, said emitter and detector both being disposed to one side of the travel path of the marking device, and reflector means disposed on the other side of the travel path of the marking device for reflecting the beam from said emitter to said detector, said detector producing first and second signals indicative of the interruptions of the beam caused by a movement of the marking device through the beam, whereby the difference in the times of occurrence of the first and second signals is functionally related to the axial position of the marking device along a first axis and the sum of the times of occurrence of the first and second signals is functionally related to the axial position of the marking device along a second axis; and
   (B) means for interpreting the signals for determining an axial position of the marking device.

8. The apparatus of claim 7 including means for determining the time of occurrence of each of the first and second signals, each such signal having a peak signal amplitude, comprising means for determining the times of occurrence of the signal with a preselected amplitude at times prior and subsequent to the occurrence of the peak signal amplitude and effectively determining the average time of occurrence for such preselected amplitude signals and providing a third signal representative thereof, repeating the process for at least one other preselected signal amplitude to develop at least one additional signal representative of the average time of occurrence for the signal with the other preselected signal amplitude and averaging the third signal and the at least one additional signal to determine the time of occurrence of each of the first and second signals.

9. The apparatus of claim 7 additionally comprising means for determining the axial position of the marking device along the first axis by the difference in the times of occurrence of the first and second signals, and for determining the axial position of the marking device along a second axis by the sum of the times of occurrence of the first and second signals.

10. Apparatus, for use in conjunction with a digital plotter incorporating controlled multiple marking devices and means for moving the same along a travel path to create displays on a medium, for determining the position of the marking device along axes of movement, comprising:
   (A) a detector assembly, disposed at a fixed axial position relative to the plotter and proximate the travel path of the marking devices, for detecting movement of a marking device relative to said detector assembly and producing signals indicative of the movement, including a pair of sensors having contacts positioned in the travel path of the marking device and mounted with respect to an axis of travel of the marking device for deflection by the marking device, and displacement transducers operatively connected to said contacts to produce first and second signals indicative of the deflection of said contacts by a movement of the marking device relative to said contacts, whereby the sum of the maxima of the first and second signals is functionally related to the axial position of the marking device along a first axis, and the times of occurrence of the beginning and ending of at least one of the first and second signals is functionally related to the axial position of the marking device along a second axis; and
   (B) means for interpreting the signals for determining an axial position of the marking device.

11. The apparatus of claim 10 wherein said detector assembly comprises a pair of spring sensors having an opposed pair of semicircular contacts, each facing the second axis.

12. The apparatus of claim 10 wherein said pair o sensors comprises a pair of spring lever arms, each lever arm having mounted thereon one of said contacts and one of said displacement transducers.

13. The apparatus of claim 10 further comprising means for summing the maxima of the first and second signals to determine the axial position of the marking device along the first axis and for averaging the times of occurrence of the beginning and ending times of at least one of the first and second signals to determine the axial position of the marking device along the second axis.

14. The apparatus of claim 13 wherein said means is functionally related to the axial position of the marking device along the second axis by averaging the average of the times of occurrence of the beginning and ending of the first signal and the average of the times of occurrence of the beginning and ending of the second signal.

15. Apparatus, for use in conjunction with a digital plotter incorporating controlled multiple marking devices and means for moving the same along a travel path to create displays on a medium, for determining the position of the marking devices along axes of movement, comprising:
   (A) a detector assembly, disposed at a fixed axial position relative to the plotter and proximate the travel path of the marking devices, for detecting movement of a marking device relative to said detector assembly and producing signals indicative of the movement, including a single spring sensor positioned in the travel path of the marking device, including a single trapezoidal contact having first and second opposed sides of equal but oppositely directed slope and a third side between said first and second sides parallel to an axis of travel of the marking device for deflection by the marking device, and a single displacement transducer operatively connected to said contact to produce a signal indicative of deflection of said contact by the marking device, whereby the axial position of the marking device along a first axis is functionally related to the geometry of said contact and a signal indicative of the deflection of said contact caused by the engagement of the marking device with said first and second sides, and the axial position of the marking device along a second axis is functionally related to the geometry of said contact and a signal indicative of the deflection of said contact caused by the engagement of the marking device with said first, second and third sides; and
   (B) means for interpreting the signals for determining an axial position of the marking device.

16. A method for determining the position of multiple marking devices used with a digital plotter including means to move the marking devices to create displays on a medium along axes of movement, comprising the steps of:
   (A) providing a detector assembly disposed at a fixed axial position relative to the plotter and proximate he travel path of the marking devices;
   (B) moving a marking device relative to said detector assembly;
   (C) detecting the movement of the marking device and producing signals indicative of such movement by producing two intersecting beams of radiation in the travel path of the marking device, detecting the beams, and producing first and second signals indicative of the interruptions of the beams caused by a movement of the marking device through the beams, whereby the order in which the first and second signals occur and the difference in the times of occurrence of the first and second signals is functionally related to the axial position of the marking device along a first axis, and the average of the times of occurrence of the first and second signals is functionally related to the axial position of the marking device along a second axis; and
   (D) interpreting the signals for determining an axial position of the marking device.

17. The method of claim 16 including the steps of determining the time of occurrence of each of the first and second signals, each such signal having a peak signal amplitude, comprising determining the times of occurrence of the signal with a preselected amplitude at times prior and subsequent to the occurrence of the peak signal amplitude and effectively determining the average time of occurrence for such preselected amplitude signals and providing a third signal representative thereof, repeating the process for at least one other preselected signal amplitude to develop at least one additional signal representative of the average time of occurrence for the signal with the other preselected signal amplitude and averaging the third signal and the at least one additional signal to determine the time of occurrence of each of the first and second signals.

18. The method of claim 17 wherein the plurality of preselected amplitudes subsequent to the first preselected amplitude are progressively increased by a fixed quantity.

19. The method of claim 16 additionally comprising the steps of determining the axial position of the marking device along the first axis by the order in which the first an second signals occur and the difference in the times of occurrence of the first and second signals, and determining the axial position of the marking device along a second axis by the geometry of said detector assembly and the sum of the times of occurrence of the first and second signals.

20. The method of claim 16 wherein the position of the marking device relative to the point of intersection of the two beams is determined by the steps of detecting which of the two beams is interrupted first as the marking device passes through said detector assembly to produce a third signal indicative of the position of the marking device relative to a given axis passing through the point of intersection of the two beams parallel to the second axis, determining the difference in the times of interruption of the beams to produce a fourth signal, and combining the third and fourth signals to provide a fifth signal indicative of the position of the marking device along the first axis.

21. The method of claim 16 including the step of causing the beams to cross the second axis at equal angles thereto.

22. A method for determining the position of multiple marking devices used with a digital plotter including means to move the marking devices to create displays on a medium along axes of movement, comprising the steps of:
(A) providing a detector assembly disposed at a fixed axial position relative to the plotter and proximate the travel path of the marking devices;
(B) moving a marking device relative to the detector assembly;
(C) detecting the movement of the marking device and producing signals indicative of such movement by producing a single beam of radiation, reflecting the beam, detecting the reflected beam, and producing first and second signals indicative of the interruptions of the beam caused by a movement of the marking device through the beam, the beam being both emitted and detected on one side of the travel path of the marking device and reflected on the other side of the travel path of the marking device, whereby the difference in the times of occurrence of the first and second signals is functionally related to the axial position of the marking device along a first axis and the sum of the times of occurrence of the first and second signals is functionally related to the axial position of the marking device along a second axis; and
(D) interpreting the signals for determining an axial position of the marking device.

23. The method of claim 22 including the steps of determining the time of occurrence of each of the first and second signals, each such signal having a peak signal amplitude, comprising determining the times of occurrence of the signal with a preselected amplitude at times prior and subsequent to the occurrence of the peak signal amplitude and effectively determining the average time of occurrence for such preselected amplitude signals and providing a third signal representative thereof, repeating the process for at least one other preselected signal amplitude to develop at least one additional signal representative of the average time of occurrence for the signal with the other preselected signal amplitude and averaging the third signal and the at least one additional signal to determine the time of occurrence of each of the first and second signals.

24. The method of claim 22 additionally comprising the steps of determining the axial position of the marking device along the first axis by the difference in the times of occurrence of the first and second signals, and determining the axial position of the marking device along a second axis by the geometry of said detector assembly and the sum of the times of occurrence of the first and second signals.

25. A method for determining the position of multiple marking devices used with a digital plotter including means to move the marking devices to create displays on a medium along axes of movement, comprising the steps of:
(A) providing a detector assembly, disposed at a fixed axial position relative to the plotter and proximate the travel path of the marking devices, including a pair of contacts positioned in the travel path of the marking device and mounted with respect to an axis of travel of the marking device for defletion by the marking device;
(B) moving a marking device relative to the detector assembly;
(C) detecting the movement of the marking device and producing signals indicative of such movement by detecting the deflection of the contacts and producing first and second signals indicative of the deflection of the contacts by a movement of the marking device relative to the contacts, whereby the sum of the maxima of the first and second signals is functionally related to the axial position of the marking device along a first axis, and the times of occurrence of the beginning and ending of at least one of the first and second signals is functionally related to the axial position of the marking device along a second axis; and
(D) interpreting the signals for determining an axial position of the marking device.

26. The method of claim 25 wherein said pair of contacts are an opposed pair of semicircular contacts, each facing the second axis.

27. The method of claim 25 including the step of providing strain gauges functionally associated with the contact to detect the deflections and produce the first and second signals.

28. The method of claim 25 further comprising the steps of summing the maximal of the first and second signals to determine the axial position of the marking device along the first axis, and averaging the times of occurrence of the beginning and ending times of at least one of the first and second signals to determine the axial position of the marking device along the second axis.

29. The method of claim 28 wherein the axial position of the marking device along the second axis is determined by the step of averaging the average of the times of occurrence of the beginning and ending of the first signal and the average of the times of occurrence of the beginning and ending of the second signal.

30. A method for determining the position of multiple marking devices used with a digital plotter including means to move the marking devices to create displays on a medium along axes of movement, comprising the steps of:
  (A) providing a detector assembly, disposed at a fixed axial position relative to the plotter and in the travel path of the marking devices, including a single trapezoidal contact having first and second opposed sides of equal but oppositely directed slope and a third side between said first and second sides parallel to an axis of travel of the marking device for deflection by the marking device;
  (B) moving a marking device relative to the detector assembly;
  (C) detecting the movement of the marking device and producing signals indicative of such movement by producing a signal indicative of deflection of said contact by the marking device, whereby the axial position of the marking device along a first axis is functionally related to the geometry of said contact and a signal indication of the deflection of said contact caused by the engagement of the marking device with said first and second sides, and the axial position of the marking device along a second axis is functionally related to the geometry of said contact and a signal indicative of the deflection of said contact caused by the engagement of the marking device with said first, second and third sides; and
  (D) interpreting the signals for determining an axial position of the marking device.

* * * * *